United States Patent
Warther (10) Patent No.: US 10,121,101 B1
(45) Date of Patent: *Nov. 6, 2018

(54) ELECTRONIC LUGGAGE ID TAG

(71) Applicant: Vanguard Identification Systems, Inc., West Chester, PA (US)

(72) Inventor: Richard O. Warther, West Chester, PA (US)

(73) Assignee: Vanguard Identification Systems, Inc., West Chester, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/616,350

(22) Filed: Jun. 7, 2017

Related U.S. Application Data (60) Provisional application No. 62/346,824, filed on Jun. 7, 2016.

(51) Int. Cl.
*G06K 19/06* (2006.01)
*G06K 19/077* (2006.01)

(52) U.S. Cl.
CPC . *G06K 19/07758* (2013.01); *G06K 19/07773* (2013.01)

(58) Field of Classification Search
CPC ............. G06K 19/04; G06K 19/06028; G06K 19/06187; G06K 19/07726; G06K 19/07749; G06K 19/12; G06K 19/14; G06K 19/077; G06K 19/07707; G06K 19/07716; G06K 19/07758; G06K 7/10366
USPC ...................................................... 235/492
See application file for complete search history.

(56) References Cited

U.S. PATENT DOCUMENTS

| 1,133,303 | A | 3/1915 | Martineau |
| 1,356,976 | A | 10/1920 | Exley |
| 2,740,654 | A | 4/1956 | Orschel |
| 6,624,752 | B2 * | 9/2003 | Klitsgaard ............. A45C 13/24 340/572.1 |

(Continued)

FOREIGN PATENT DOCUMENTS

| GB | 2500054 A | 9/2013 |
| GB | 2523633 A | 9/2015 |

OTHER PUBLICATIONS

Office Action dated May 18, 2018 in AU Application No. 2018100329.

*Primary Examiner* — Thien M Le
(74) *Attorney, Agent, or Firm* — Panitch Schwarze Belisario & Nadel LLP (57) ABSTRACT

A programmable luggage tag comprising a programmable electronic visual display assembly including a display screen, a radio receiver, a processor operably connecting the display assembly with the radio receiver, the processor configured to permit programming of an image shown on the display screen in response to image commands received through the radio receiver, a unitary housing having first and second opposing major outer sides and first and second opposing minor outer sides arranged substantially perpendicularly to the first and second opposing major outer sides, the housing containing the display assembly, the radio receiver, and the processor, the first major outer side of the housing being substantially transparent, revealing the display screen, the housing configured to receive a cord through a first chamber integrally formed within the housing, and a planar flap fixedly connected with the second major outer side of the housing.

17 Claims, 7 Drawing Sheets

(56) References Cited

U.S. PATENT DOCUMENTS

| | | | |
|---|---|---|---|
| 6,753,830 B2 * | 6/2004 | Gelbman | G06F 3/147 |
| | | | 340/5.91 |
| 6,924,781 B1 | 8/2005 | Gelbman | |
| 7,535,358 B2 | 5/2009 | Crider et al. | |
| 7,626,505 B2 | 12/2009 | August et al. | |
| 7,719,421 B2 | 5/2010 | Zovic et al. | |
| 7,791,489 B2 | 9/2010 | Gelbman et al. | |
| 7,815,116 B2 | 10/2010 | Gelbman | |
| 7,845,569 B1 * | 12/2010 | Warther | G06K 19/04 |
| | | | 235/375 |
| 8,052,061 B2 * | 11/2011 | Warther | G06K 19/04 |
| | | | 235/487 |
| 9,097,788 B1 | 8/2015 | Humphrey et al. | |
| 9,129,167 B2 | 9/2015 | Motley, III et al. | |
| 9,195,865 B2 | 11/2015 | Motley, III et al. | |
| 9,224,084 B2 * | 12/2015 | Warther | G06K 7/10366 |
| 9,424,547 B2 * | 8/2016 | Gazdzinski | G06Q 10/08 |
| 2005/0193783 A1 | 9/2005 | Zovic et al. | |
| 2008/0158217 A1 | 7/2008 | Hata et al. | |
| 2012/0062367 A1 | 3/2012 | Warther | |
| 2012/0098642 A1 | 4/2012 | Krawczewicz et al. | |
| 2013/0043979 A1 | 2/2013 | Huang et al. | |
| 2014/0151173 A1 | 6/2014 | Reh et al. | |
| 2014/0191851 A1 | 7/2014 | Warther | |
| 2014/0291405 A1 | 10/2014 | Harkes | |
| 2015/0122893 A1 * | 5/2015 | Warther | G06K 7/10366 |
| | | | 235/492 |
| 2015/0324745 A1 | 11/2015 | Goodall et al. | |
| 2016/0183653 A1 * | 6/2016 | Warther | G06K 19/07726 |
| | | | 340/10.51 |

* cited by examiner

ELECTRONIC LUGGAGE ID TAG

BACKGROUND OF THE INVENTION

The present invention relates to electronic luggage tags, and particularly to such tags which are reusable.

Travelers are encouraged or required by airlines to tag their suitcases and other luggage to assist in owner identification. Many travelers use permanent tags with personal information printed or hand written on the tags. Some bags and luggage are equipped with viewing compartments configured to receive a conventional business card carrying the same information. Many airlines even provide travelers with disposable tags on which the travelers can provide personal identification and contact information if the traveler's bags do not include their own tags.

One drawback of such tags is that they are not integrated into airline baggage handling/management systems, which utilize special, machine readable (optically scanned) disposable tags applied by the airlines to each piece of baggage given over to the airline to transport.

Another drawback is that the machine readable disposable tags applied by the airlines are not reusable. Discarded machine readable luggage tags create over a million pounds of waste per year.

It is desirable to provide a permanent luggage tag that could be used repeatedly by travelers, is capable of integration into carriers' baggage handling/management systems in place of single use, printed airline tags, and includes a durable method of connection to traveler's luggage.

BRIEF SUMMARY OF THE INVENTION

In one aspect, the present invention is an programmable luggage tag comprising a programmable electronic visual display assembly including a display screen, a radio receiver, a processor operably connecting the display assembly with the radio receiver, the processor configured to permit programming of an image shown on the display screen in response to image commands received through the radio receiver, a unitary housing having first and second opposing major outer sides and first and second opposing minor outer sides arranged substantially perpendicularly to the first and second opposing major outer sides, the housing containing the display assembly, the radio receiver, and the processor, the first major outer side of the housing being substantially transparent, revealing the display screen, the housing configured to receive a cord through a first chamber integrally formed within the housing, and a planar flap fixedly connected with the second major outer side of the housing.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of the device and related parts thereof. The terminology includes the above-listed words, derivatives thereof and words of similar import.

Referring to FIGS. 1-15, a preferred embodiment of a programmable luggage ID tag 10 has two distinct components, including a first, rigid hollow unitary housing component or housing, generally indicated by reference numeral 12, and a second, resiliently flexible planar identification flap component or flap, generally indicated by reference numeral 14.

The housing 12 preferably includes a protective case 80. Referring to FIGS. 1-6, the case 80 is preferably a single-piece shell which is preferably constructed of a relatively lightweight, high impact plastic, such as high-impact polystyrene ("HIPS") or acrylonitrile butadiene styrene ("ABS"), a metal, such as an aluminum, or a combination or composite of polymer and metal pieces. The housing 12 further includes a programmable, electronic visual display assembly, indicated generally as 60, with a display screen 62, a protective screen 61, and other circuitry 70, which includes a supporting circuit board 72. Each of the display screen 62, protective screen 61 and other circuitry 70 are preferably received and housed in or on the case 80. The display screen 62 is visible through the substantially transparent protective screen 61. The protective screen 61 is preferably constructed of polycarbonate materials and is preferably additionally coated with one or more protective and reflection resistant (anti-glare) coatings to enhance readability of the display 60 by optical scanners or the like, but is not limited to constructions utilizing such materials or to inclusion of the described coatings. The protective screen 61 is preferably bonded to the display screen 62 through any suitable methods and techniques, such as with a silicone gel or other adhesive. The display screen 62 is preferably bonded to the circuit board 72 through any suitable methods and techniques, such as with a silicone gel or other adhesive. The display assembly 60 is preferably secured to the case 80 via a laser welding process, but may alternatively be secured to the case 80 by a snap fit, fasteners, hook and loop material, clamping, adhesive bonding or other such methods or techniques.

Referring to FIGS. 1-5, the flap 14 of the preferred tag 10 is a planar sheet preferably formed of a flexible polymer, more preferably a microporous material like PPG Industries' Teslin®. The flap 14 functions as or contains at least one radio frequency identification ("RFID") transponder assembly, which is provided by an antenna and resonant circuitry (not shown). Preferably, the flap 14 or RFID transponder assembly is passive with an ultra-high operating radio frequency ("UHF"). The passive RFID transponder assembly of the flap 14 is preferably powered only from an external interrogation signal. The flap 14 is preferably coated with or bonded to a polyester film (not shown) to provide additional strength, wear, and soil resistance properties to the outer surface of the flap 14. However, other non-porous polymer sheet materials such as polyvinyl chloride ("PVC") or polycarbonate ("PC") may be considered or preferred based on designer or consumer preferences. The construction of polyester or other polymer films preferably gives the flap 14 the thickness and flexible resilience of a conventional credit or debit card. In contrast to the case 80, the flap 14 preferably has a stiffness with respect to force applied against either of its major planar surfaces less than any given stiffness of the case 80 with respect to force applied to its closed major outer side. The flap 14 is also preferably thinner than any given thickness of the case 80.

The RFID transponder assembly of the flap 14 may be assigned a unique permanent identification code to uniquely identify the assembly. The identification code is loaded into non-volatile memory of the assembly, is non-alterable, and is transmitted by the assembly in response to an external interrogation signal to identify the assembly to the interrogator upon request. Such identification can be used by a traveler to identify the luggage tag using a suitable device, such as a smartphone, to then initiate connection to the other circuitry 70 as described herein. The identification can also be used in conjunction with baggage handling systems at airports around the world to allow a traveler to track the progress of his or her luggage along its journey. Airports equipped with such technology have devices capable of interrogating the RFID signals of the luggage tag 10 at various places throughout the airport's luggage handling system, which can be configured to send alerts to travelers notifying the traveler as his or her luggage passes certain points in the airport via electronic mail, SMS, or any other suitable means of communication.

The flap 14 is secured to the case 80, preferably by one or more mechanical connections, welds, or adhesive bonding, but is not so limited and may be otherwise fixedly secured to the case 80 by clamping, fastening or other methods and techniques. The flap 14 is also preferably held in place by a number of hollow posts 84 to be received in a number of openings or flap holes 85 provided through a proximal end portion of the flap 14.

Separating the RFID transponder assembly in the flap 14 from the display assembly 60 and the circuit board 72 in the case 80 provides several benefits. Such separation permits the separate manufacture of the flap 14 by conventional, high speed, lower cost, cold lamination and printing processes typically used in credit/debit card and RFID tag and card manufacture industries. The flap 14 can be manufactures without subjecting it to the temperatures and pressures of the injection molding processes used to manufacture the hard polymer case 80, in which RFID transponder assemblies have been installed by others. Such separation is also beneficial to minimize possible interference between the RFID transponder assembly in the flap 14 and the display 60 and other circuitry 70 in the case 80. This type of interference could negatively impact the effective range of the RFID transponder in the flap 14.

Teslin® is a microvoided/microporous polysilicate sheet material of the type described in detail in U.S. Pat. No. 4,861,644, the contents of which are incorporated by reference herein. A copy of the patent is attached to this application as Appendix A. This polysilicate material is very porous with an essentially uniform porosity throughout of greater than thirty percent (30%) by volume, more typically forty-five to sixty percent (45-60%) in commercial grades, and with an average pore size of about one micron or less. Microvoided/microporous, polysilicate sheet material is suitable for various types of printing including laser printing, although other commercially available, printable synthetic paper products might be used as the RFID transponder of the flap 14.

Microporous polysilicate sheet material itself provides several additional distinct advantages. Such sheet material is waterproof and durable. The preferred microporous polysilicate material wraps and mechanically protects the RFID transponder of the flap 14 better than any known non-porous polymer material or paper. The microporosity of the flexible polysilicate sheet material acts as a cushion and even permits the material to collapse/compress over a chip or other circuitry of the RFID assembly, thereby reducing inherent stress on the assembly. The flexible polysilicate sheet material is also considerably more durable than PVC and/or PE commonly used in RFID cards and tags, withstanding flexing and high mechanical pressure preferably without cracking, peeling or delaminating over wide operating and mechanical stress ranges. Such properties preferably increase the useful life of the flap 14 several fold over tags made with other non-porous polymer core materials and the flap 14 may be constructed of nearly any material that is able to take on the size and shape of the flap 14, withstand the normal operating conditions of the flap 14 and having similar properties as those described above.

A microporous polysilicate sheet further provides enhanced electrical performance properties including a two to three decibel (2-3 dB) increase in radio frequency ("RF") signal propagation read range, which translates into approximately doubling the operating range of the RFID transponder assembly of the flap 14 compared to an identical assembly embedded in conventional, non-porous polymer (e.g. PC, PVC or polyethylene terephthalate ("PET")) materials. It also provides faster static decay times and has lower surface resistivity than PVC, PET and PC, thereby providing superior static dissipative qualities compared with PVC and/or PE core materials typically used in RFID tags.

Figure 1:
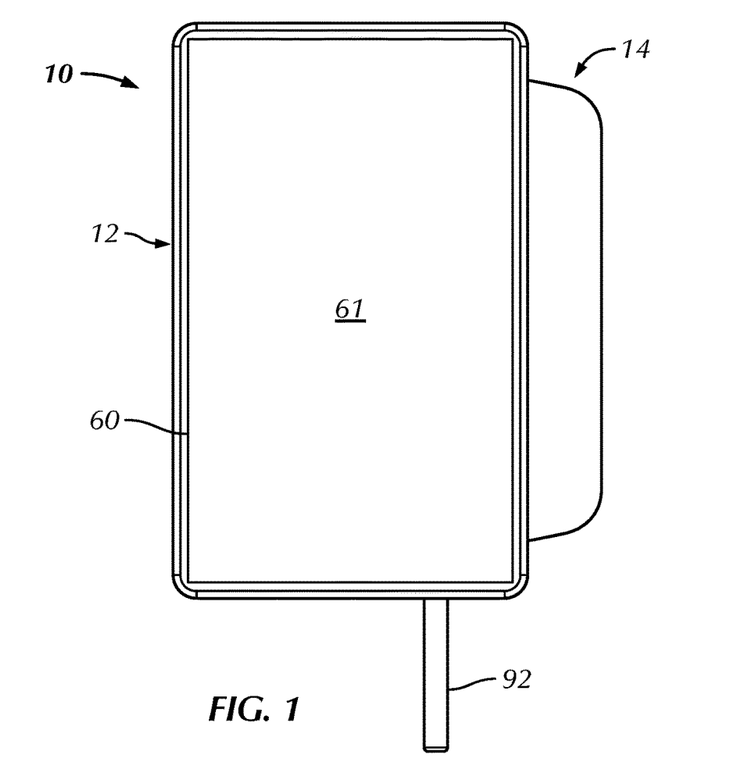
FIG. 1 is a front elevational view of a luggage tag in accordance with a first preferred embodiment of the invention.
Figure 2:
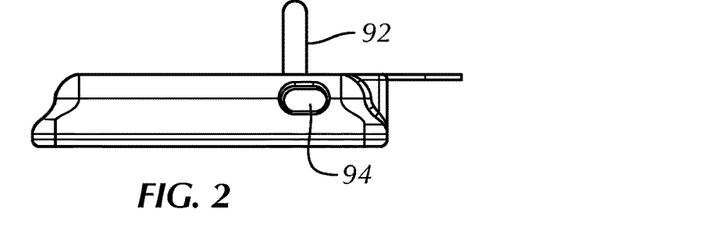
FIGS. 2 and 3 are left and right side elevational views of the luggage tag of FIG. 1, respectively.
Figure 3:
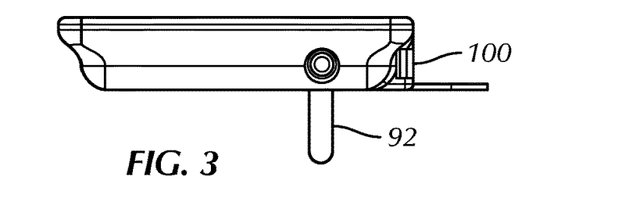
Figure 4:
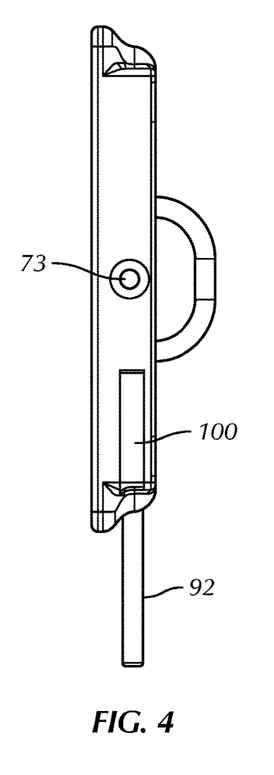
FIG. 4 is a top plan view of the luggage tag of FIG. 1.
Figure 5:
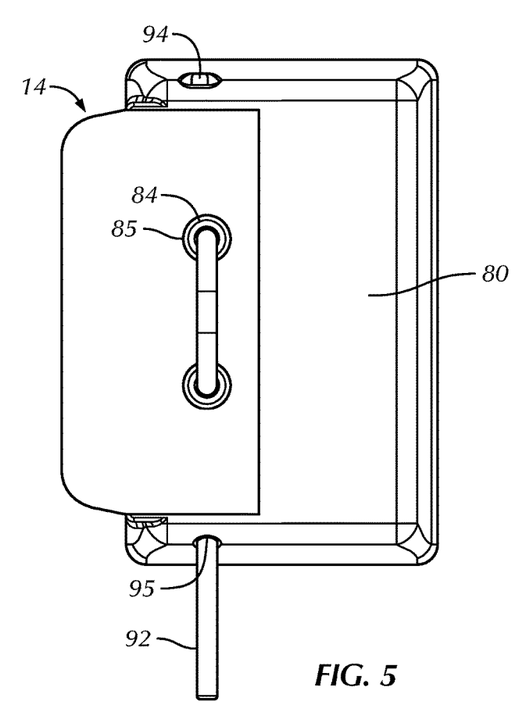
FIG. 5 is a rear elevational view of the luggage tag of FIG. 1.
Figure 6:
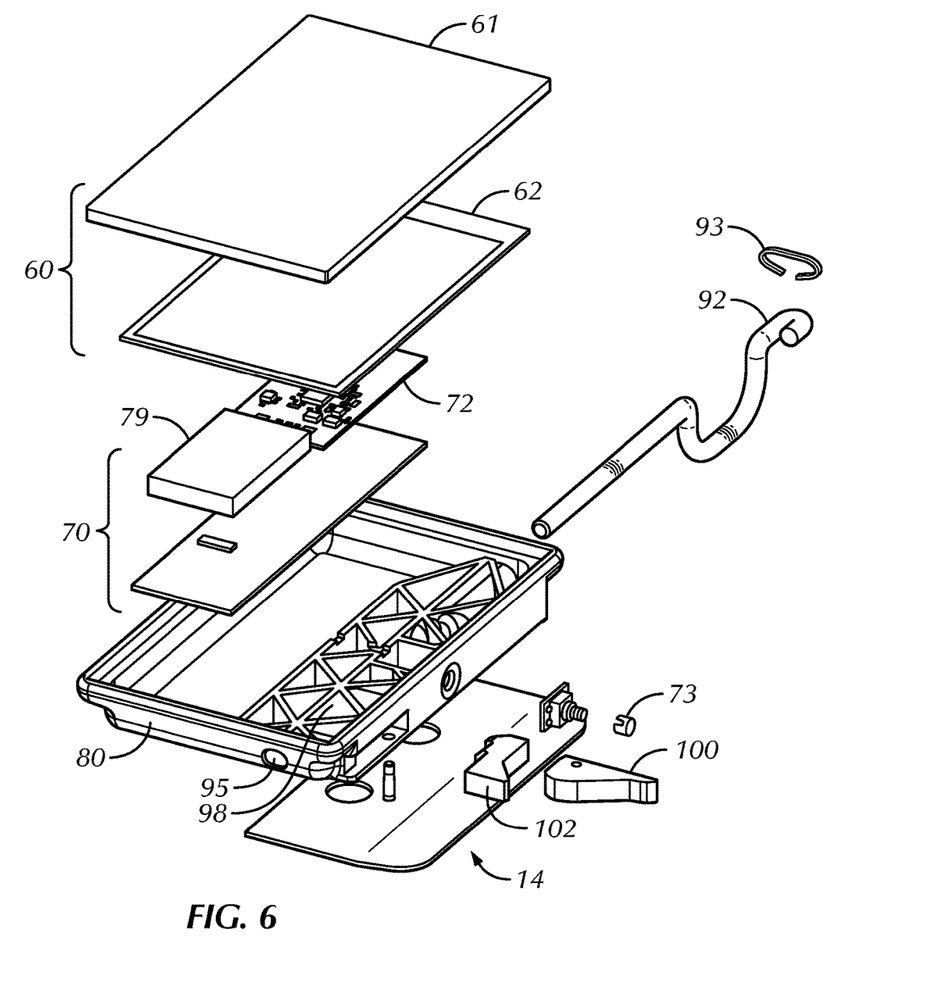
FIG. 6 is an exploded, front perspective view of the luggage tag of FIG. 1.
Figure 7:
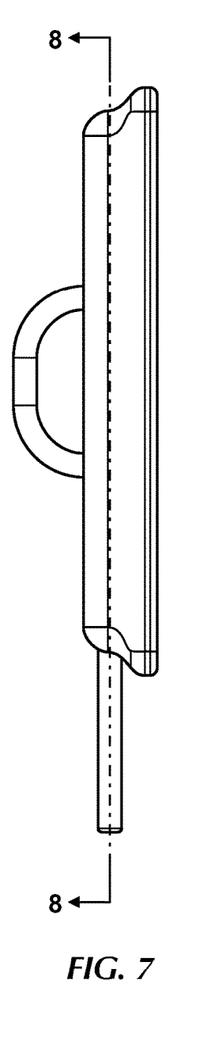
FIG. 7 is another top plan view of the luggage tag of FIG. 1.
Figure 8:
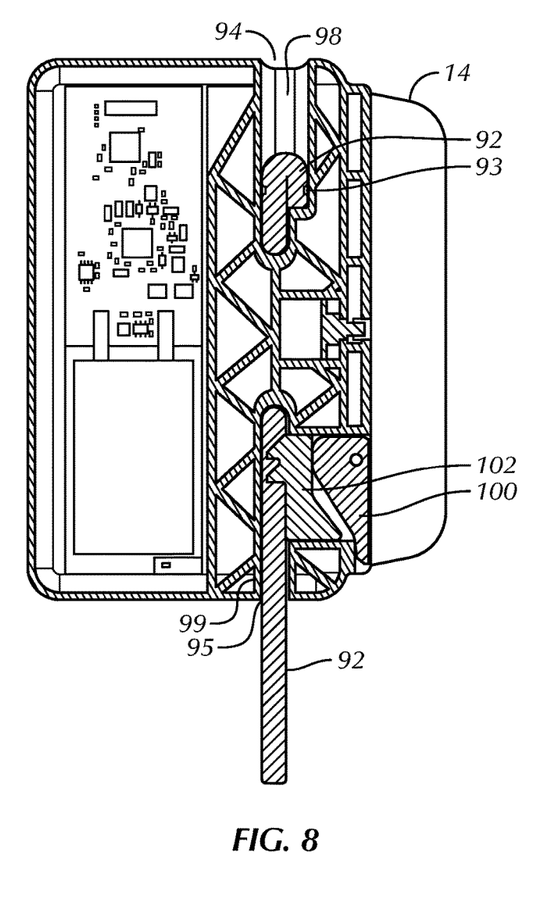
FIG. 8 is a cross-sectional elevational view of the luggage tag of FIG. 1, taken along the line A-A of FIG. 7, wherein the lever and stop of the tag are engaged.
Figure 9:
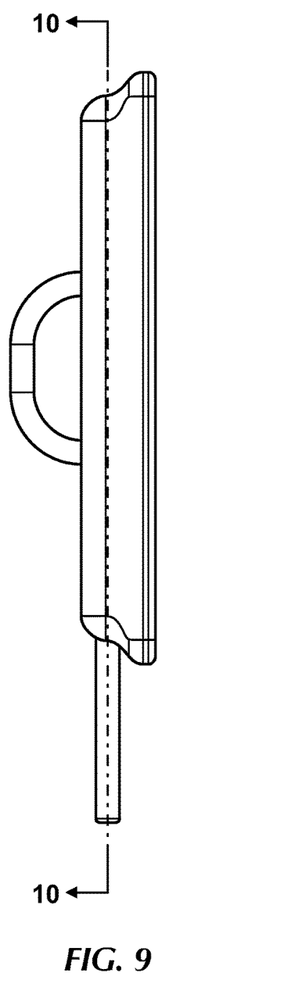
FIG. 9 is another top plan view of the luggage tag of FIG. 1.
Figure 10:
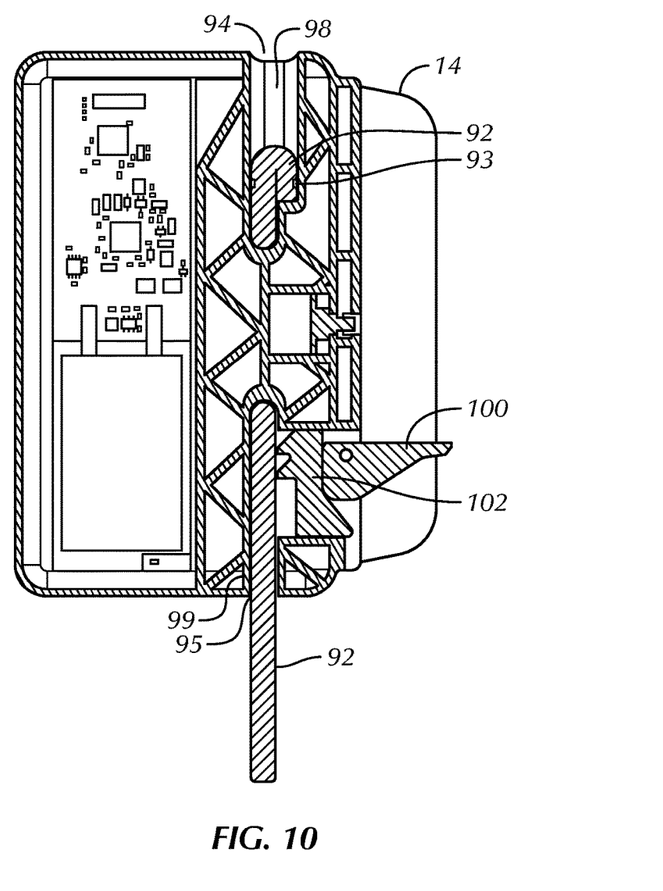
FIG. 10 is a cross-sectional elevational view of the luggage tag of FIG. 1, taken along the line B-B of FIG. 9, wherein the lever and stop of the tag are disengaged.
Figure 11:
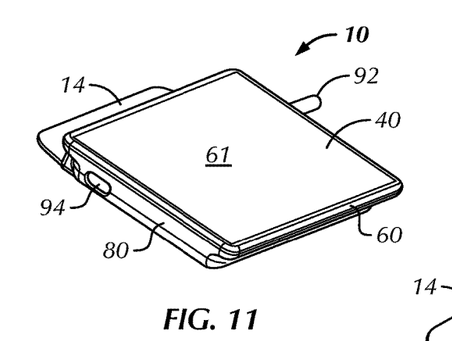
FIG. 11 is a front perspective view of the luggage tag of FIG. 1.
Figure 12:
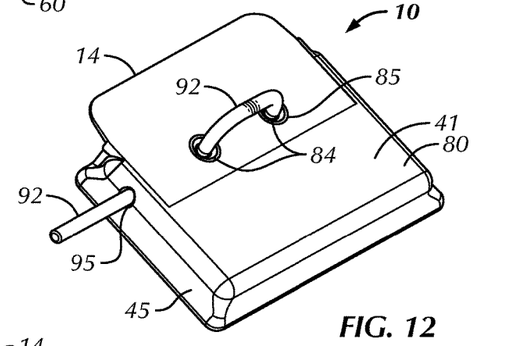
FIG. 12 is a rear perspective view of the luggage tag of FIG. 1.
Figure 13:
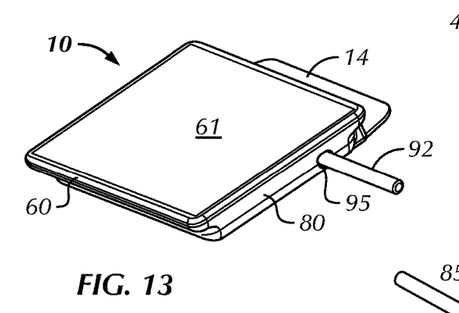
FIG. 13 is an alternative front perspective view of the luggage tag of FIG. 1.
Figure 14:
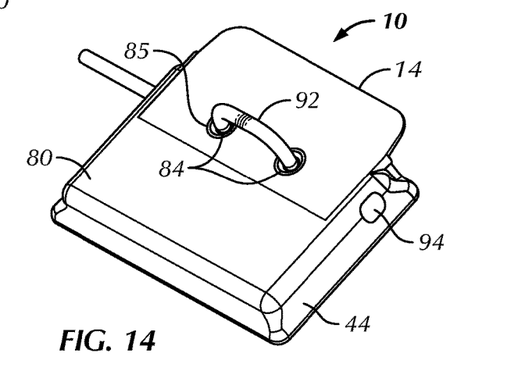
FIG. 14 is an another rear perspective view of the luggage tag of FIG. 1.
Figure 15:
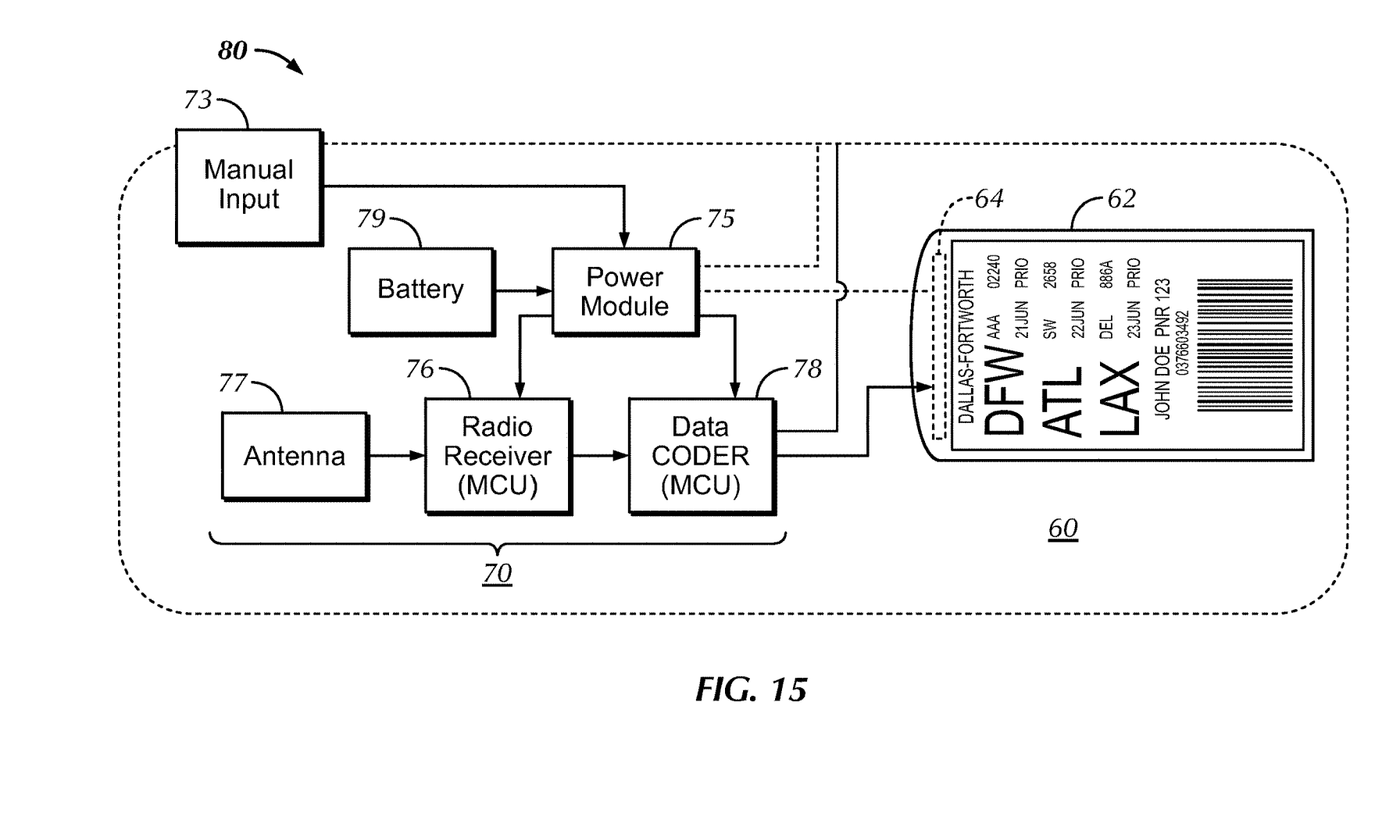
FIG. 15 is a schematic block diagram of the electrical components associated with the programmable bistable electronic display of the luggage tag of FIG. 1.

Referring to FIGS. 1-6 and 15, the display assembly 60 and other circuitry 70 housed in the case 80 are depicted in functional schematic block diagram form in FIG. 15. The display assembly 60 includes, in addition to the physical screen 62, driver circuitry 64 that is used to generate the image resident on the screen 62. The other circuitry 70 includes a manual input device 73 that activates the remainder of the other circuitry 70 for programming/reprogramming of the image on the display 60. The input device 73 is preferably a mechanical switch that provides tactile feedback to the user, but capacitive switches and other types of devices may also be used. The input device 73 preferably causes electricity from an on-board battery power supply or battery 79 to pass through a power module 75, which is configured to generate power at appropriate voltages to operate the remaining circuit components and to interface with the driver circuitry 64 of the display 60. The remaining components include at least a wireless signal receiver 76 operably connected with an antenna 77. Either or both of the wireless signal receiver 76 and antenna 77 may optionally be located within the flap 14 for communication with a user's smart phone or other device. It will be appreciated that the other circuitry 70 includes at least one processor for controlling operation of the other components of the circuitry to program/reprogram the display assembly 60. It will further be appreciated that the control function may be divided among several processors, each performing limited functions. For example, the wireless signal receiver 76 may include a micro control unit ("MCU") to interface with the source of wireless/radio image control signals transmitted to the tag 10 to program/reprogram the display 60. A coding engine (DATA Coder) 78 may be provided as a separate module operably connected between the wireless signal receiver 76 and the display driver circuitry 64 with its own MCU configured to convert radio control signals received from the wireless control signal source (i.e. a smart device) through the receiver into command signals suitable for the driver circuitry 64. Alternatively, the receiver 76 and coding engine 78 might be combined in a single module with a single processor performing the necessary functions or the driver circuitry 64 may be "smart", with a processor configured to assume the functions of the coding engine 78 and configured so as to interface directly with the wireless signal receiver 76

The electronic visual display assembly 60 is preferably a bistable passive reflective display assembly like a sheet of flexible electronic paper ("E-paper" or "e-ink") or a "zero power" LCD display. Truly bistable visual displays generally require no continuing power to maintain an image. If the display is bistable as preferred, the battery 79 is preferably needed only to power the other circuitry 70 to receive image coding instructions and change the image of the display 60. The bistable display 60, once programmed or reprogrammed, retains its image without further power usage. Under these conditions, a "coin" type cell battery (not depicted) is preferably sufficient to power literally thousands of activations and display reprograms.

Types of commercially available, bistable displays include: cholesteric liquid crystals (ChLC) on a flexible thin film, electrophoretic, electrowetting and electrofluidic displays using charged pigment particles, water oil mixtures and aqueous pigment dispersions, respectively. More recently, E Ink Corporation has made commercially available a variety of "electronic paper displays" ("EPD"), extremely thin and flexible, in both active (thin-film-transistor liquid-crystal) and segmented configurations that might be used. This list is suggestive and not intended to be or to be considered to be all inclusive or otherwise exclusive. Moreover, while flexible displays are lighter and thinner, they are generally more expensive than glass mounted EPD's and the latter provide can provide better contrast to improve optical scanning accuracy.

Such displays can be externally programmed/reprogrammed to exhibit conventional luggage tag coded information normally provided by airlines on the paper tags currently used to identify and route passenger luggage. The present luggage tag coded information, including itinerary information and a carrier's baggage management system code number, a passenger name record ("PNR"), a reservation number or other unique record identifier or locator used by the carrier to identify the passenger and itinerary in a central data base used by the carrier, can be displayed on the display 60. The tag 10 may include other variable data (e.g. passenger name, number of checked bags or items, etc.) that would differ in content from tag to tag of different passengers or even between tags of the same passenger.

The wireless image control signal source is a suitably configured and programmed smart device. Currently, smart phones are the wireless control signal sources of choice and Bluetooth Low Energy ("BLE") is the signal format of choice as virtually all smart phones becoming available are equipped for at least BLE communication. However, other types of "short range" wireless communication formats might be used as an alternative, for example, Near Field Communication ("NFC") formats, and other short range communication formats that might become available in the future.

It should be appreciated that the preferred tag 10 lacks direct public cellular network and/or internet connectivity capability, through either a public cellular network or a wireless local area network (i. e. WLAN/Wi-Fi). All such connectivity of the tag 10 is preferably through a smart phone or other public network connection enabled device that is also enabled for short range communication with the tag. "Long range" communication refers to the normal inherent wireless communication capability provided to cell phones including smart phones to connect with a wireless public cellular communication network. It is also includes other private network communication capabilities that might be provided in a cell phone or smart device such as Motorola MOTO talk, a direct radio communication capability, which typically has a range in the kilometers. "Short range" communication refers to a separate, additional communication capability and format provided in certain smart phones and other smart devices having wireless public cellular, Wi-Fi and/or WLAN network communication capability. BLE communications are designed to have a nominal range of about fifty meters (50 m), half that of conventional Bluetooth communication. NFC has a nominal range of a fraction of a meter (practical working distance being reported to be about four centimeters (4 cm) or about one twenty-fifth of a meter (1/25 m). Other short range, non-public, non-network wireless communication protocols and equipment may become widely available in the future to supplant or upgrade Bluetooth, BLE and/or NFC and are intended to be covered by the invention.

In use, an appropriate app is preferably provided by a carrier or other third party to a passenger to load into the passenger's smart phone or other smart device with public communication network capability. When the passenger wants to program/reprogram the tag 10, the app is activated in the smart device by the passenger to automatically contact a remote database designated by the carrier through the app, via a public communication network accessible to the smart device, such as a public cellular network or the internet. The app uniquely identifies the passenger to the remote database. The remote database then identifies and transfers to the smart phone/device, data from a currently or previously created itinerary stored in or available to the remote database. The app then wirelessly transmits the display data from the smart phone or other smart device in an appropriate format (preferably BLE) to the RFID transponder assembly of the flap 14 and through the other circuitry 70 to update the display 60, which in turn displays the identity and itinerary information in a machine readable format such as a bar code.

Referring to FIGS. 11-14, the housing 12 preferably has first and second opposing major outer sides 40 and 41 arranged substantially parallel to one another. The first major outer side 40 is preferably substantially transparent to allow visual inspection of the display assembly 60. The housing 12 further preferably includes first and second minor outer sides 44 and 45 arranged substantially parallel to one another and substantially perpendicularly to the opposing major outer sides 40 and 41.

Referring to FIGS. 5, 8, 10, 12, and 14, the case 80 is preferably configured to receive a cord 92 for fastening to a user's luggage. The cord 92 is preferably a single length of elastomeric shock or "bungee" cord, but is not so limited. The cord 92 can be inserted into a first hole 94 on the first minor outer side 44. The first hole 94 leads to a first chamber 98. On the opposing end of the first chamber 98 is a hollow post 84 on the second major outer side 41. The first chamber 98 is formed as a hollow space within the case 80, sealed on all sides by the case 80 except the first hole 94 at one end and the hollow post 84 at the opposing end. Having passed through the first hole 94 and first chamber 98 and out of a hollow post 84, the cord 92 can then be fed through another of the hollow posts 84 on the second major outer side 41, which leads to a second chamber 99 which has a second hole 95 on the second minor outer side 45. Preferably, the hollow posts 84 are aligned with the flap holes 85 such that the cord 92 passes through the posts 84 and the flap holes 85 simultaneously, forming a "C" shape outside of the case 80 and thereby providing additional force binding the flap 14 against the second major outer side 41 of the case 80. Having been fed out of the second hole 95, the remaining length of the cord 92 that extends from the second hole 95 can be fastened to the user's luggage in whatever method the user chooses, such as by tying a knot around a handle of the luggage or attachment to a key ring. The cord 92 is preferably a length sufficient to allow six inches (6") or more of the cord 92 to extend from the second hole 95 to more easily allow a user to attach the cord 92 to his or her luggage.

The first chamber 98 is preferably configured to be approximately twice as wide as the cord 92, while the second chamber 99 is preferably configured to be approximately equal to the width of the cord 92. The extra width of the first chamber 98 can preferably accommodate measures to prevent the cord from being fully pulled through the first chamber 98, such as by folding over the end of the cord 92 and fastening it with a staple 93. Instead of the staple 93, the folded end of the cord 92 may be fastened with glue, thread, or the like or by tying it the end of the cord 92 in a knot.

The case 80 also preferably includes a cord locking mechanism 100, 102 for locking the cord 92 in place in or near the second chamber 99. As shown in the preferred embodiment in FIGS. 7-10, the locking mechanism is preferably comprised of a pivoting lever 100 and a stop 102. The stop 102 preferably includes means, such as teeth or knurling, for engaging the cord 92 within the second chamber 99 and locking the cord 92 in place, but is not so limited and may include nearly any mechanism that performs the engagement function. In use, a user can toggle or pivot the lever 100 from an open position, shown in FIG. 10, to a closed position, shown in FIG. 8. In the closed position, the lever 100 presses the stop 102 into the second chamber 99 and into engagement with the cord 92 to lock the cord 92 into place. The user can then release the lever 100 if he or she desires to remove the cord 92 from the remainder of the tag 10. The cord 92 is not limited to being connected to the case 80 using the stop 102 and lever 100 configuration and may be otherwise secured to or integrally formed with the case 80, such as by fastening, clamping, adhesive bonding, co-molding or other related methods, techniques or mechanisms.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the present disclosure.

The invention claimed is:

1. A programmable luggage tag comprising:
  a programmable electronic visual display assembly including a display screen;
  a radio receiver;
  a processor operably connecting the display assembly with the radio receiver, the processor configured to permit programming of an image shown on the display screen in response to image commands received through the radio receiver;
  a unitary housing having first and second opposing major outer sides and first and second opposing minor outer sides arranged substantially perpendicularly to the first and second opposing major outer sides, the housing containing the display assembly, the radio receiver, and the processor, the first major outer side of the housing being substantially transparent, revealing the display screen, the housing configured to receive a cord through a first chamber integrally formed within the housing; and
  a planar flap fixedly connected with the second major outer side of the housing.

2. The programmable luggage tag of claim 1, wherein the flap includes a radio frequency identification transponder assembly.

3. The programmable luggage tag of claim 1, wherein the first opposing minor outer side of the housing includes a hole through which a first end of the first chamber is accessible.

4. The programmable luggage tag of claim 3, wherein the second major outer side of the housing includes a hollow tube through which a first end of a second chamber is accessible.

5. The programmable luggage tag of claim 4, wherein the flap further includes a hole substantially aligned with the hollow tube of the second major outer side of the housing.

6. The programmable luggage tag of claim 1, further comprising:
  a second chamber integrally formed within the housing for receiving the cord.

7. The programmable luggage tag of claim 6, wherein the first opposing minor outer side of the housing includes a hole through which a first end of the first chamber is accessible, the second opposing minor outer side includes a hole through which a first end of the second chamber is accessible, the second major outer side of the housing includes a first hollow tube through which a second end of the first chamber is accessible and a second hollow tube through which a second end of the second chamber is accessible, the flap further includes first and second holes substantially aligned with the first and second hollow tubes of the second major outer side of the housing.

8. The programmable luggage tag of claim 1, further comprising:
a cord locking mechanism configured to activate an engagement mechanism which locks the cord into place within the luggage tag.

9. The programmable luggage tag of claim 1, wherein the housing has a housing stiffness and the flap has a flap stiffness, the flap stiffness being less than the housing stiffness.

10. The programmable luggage tag of claim 1, wherein the housing is constructed of a material selected from the group consisting of a polymeric material, a metal material, a combination of metal pieces, a combination of high impact plastic pieces, a combination of metal and plastic pieces, an assembly of metal and polymeric components.

11. The programmable luggage tag of claim 1, wherein the display screen is constructed of a polycarbonate material.

12. The programmable luggage tag of claim 1, wherein the housing further contains a battery and an input device exposed from the case for manual operation, the input device being configured to operably connect the battery with at least the processor and the radio receiver.

13. The programmable luggage tag of claim 1, wherein the radio receiver and the processor are configured for Bluetooth communication.

14. The programmable luggage tag of claim 1, wherein the radio frequency identification transponder assembly is configured for Ultra High Frequency operation.

15. The programmable luggage tag of claim 1, wherein the radio frequency identification transponder assembly is electrically isolated from the housing.

16. The programmable luggage tag of claim 1, wherein the radio frequency identification transponder assembly is passive and powered only from an external interrogation signal.

17. The programmable luggage tag of claim 1, wherein the display assembly includes a bistable display.

* * * * *

UNITED STATES PATENT AND TRADEMARK OFFICE
CERTIFICATE OF CORRECTION

PATENT NO. : 10,121,101 B1  
APPLICATION NO. : 15/616350  
DATED : November 6, 2018  
INVENTOR(S) : Warther et al.

Page 1 of 1

It is certified that error appears in the above-identified patent and that said Letters Patent is hereby corrected as shown below:

On the Title Page

Item (12) "Warther" should read --Warther et al.--

Please replace:
"(72) Inventor: Richard O. Warther, West Chester, PA (US)"
With:
--(72) Inventors: Richard O. Warther, West Chester, PA (US); John M. Sayles, Media, PA (US)--

Signed and Sealed this
Twenty-fifth Day of June, 2019

Andrei Iancu
*Director of the United States Patent and Trademark Office*